United States Patent
Gopalkrishna et al.

(10) Patent No.: US 11,808,680 B2
(45) Date of Patent: Nov. 7, 2023

(54) SYSTEM AND METHOD FOR CHARACTERIZING LIQUID METAL DROPS JETTED FROM A 3D PRINTER USING A STROBE LIGHT

(71) Applicant: XEROX CORPORATION, Norwalk, CT (US)

(72) Inventors: Vijay Kumar Baikampady Gopalkrishna, Santa Clara, CA (US); Raja Bala, Pittsford, NY (US); Palghat Ramesh, Pittsford, NY (US); David Allen Mantell, Rochester, NY (US); Peter Michael Gulvin, Webster, NY (US); Mark A. Cellura, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 286 days.

(21) Appl. No.: 17/332,445

(22) Filed: May 27, 2021

(65) Prior Publication Data

US 2022/0381666 A1 Dec. 1, 2022

(51) Int. Cl.
| | |
|---|---|
| *G01N 15/02* | (2006.01) |
| *B22F 12/90* | (2021.01) |
| *B22F 10/31* | (2021.01) |
| *B22F 10/85* | (2021.01) |
| *B33Y 40/00* | (2020.01) |
| *B33Y 50/02* | (2015.01) |
| *B33Y 10/00* | (2015.01) |

(52) U.S. Cl.
CPC ......... *G01N 15/0227* (2013.01); *B22F 10/31* (2021.01); *B22F 10/85* (2021.01); *B22F 12/90* (2021.01); *B33Y 10/00* (2014.12); *B33Y 40/00* (2014.12); *B33Y 50/02* (2014.12)

(58) Field of Classification Search
CPC .................................................. G01N 15/0227
See application file for complete search history.

(56) References Cited

U.S. PATENT DOCUMENTS

| | | | |
|---|---|---|---|
| 2007/0013736 A1* | 1/2007 | Higginson | ........... B41J 2/17526 347/37 |
| 2021/0379664 A1* | 12/2021 | Gibson | .................... B08B 1/04 |
| 2022/0379564 A1 | 12/2022 | Gopalkrishna et al. | |

OTHER PUBLICATIONS

Author UNKNOWN, "JetXpert Drop Analysis," downloaded on Apr. 8, 2021 from ImageXpert, https://imagexpert.com/drop-analysis/, date unknown, 4 pages.

* cited by examiner

*Primary Examiner* — Nathan T Leong
(74) *Attorney, Agent, or Firm* — MH2 Technology Law Group LLP

(57) ABSTRACT

A method includes illuminating a drop with a pulse of light from a light source. A duration of the pulse of light is from about 0.0001 seconds to about 0.1 seconds. The method also includes capturing an image, video, or both of the drop. The method also includes detecting the drop in the image, the video, or both. The method also includes characterizing the drop after the drop is detected. Characterizing the drop includes determining a size of the drop, a location of the drop, or both in the image, the video, or both.

24 Claims, 7 Drawing Sheets

SYSTEM AND METHOD FOR CHARACTERIZING LIQUID METAL DROPS JETTED FROM A 3D PRINTER USING A STROBE LIGHT

TECHNICAL FIELD

The present teachings relate generally to three-dimensional (3D) printing and, more particularly, to capturing a video of liquid metal drops being jetted through a nozzle of the 3D printer while a strobe light illuminates the drops, and then detecting and characterizing the drops in the video.

BACKGROUND

A 3D printer builds (e.g., prints) a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for depositing liquid metal layer upon layer to form a 3D metallic object. Magnetohydrodynamic refers to the study of the magnetic properties and the behavior of electrically conducting fluids.

In a MHD printer, an electrical current flows through a metal coil, which produces time-varying magnetic fields that induce eddy currents within a reservoir of liquid metal compositions. Coupling between magnetic and electric fields within the liquid metal results in Lorentz forces that cause drops of the liquid metal to be ejected (also referred to as jetted) through a nozzle of the printer. The nozzle may be controlled to select the size and shape of the drops. The drops land upon the substrate and/or the previously deposited drops to cause the 3D object to grow in size.

Non-uniform jetting (also referred to as drop jitter) may result in the 3D object having inferior quality. Currently, the detection of drop jitter is manual, which is both time consuming and error prone. Therefore, what is needed is an improved system and method for detecting and characterizing drops that are jetted through the nozzle of the 3D printer to reduce or prevent drop jitter.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method is disclosed. The method includes illuminating a drop with a pulse of light from a light source. A duration of the pulse of light is from about 0.0001 seconds to about 0.1 seconds. The method also includes capturing an image, video, or both of the drop. The method also includes detecting the drop in the image, the video, or both. The method also includes characterizing the drop after the drop is detected. Characterizing the drop includes determining a size of the drop, a location of the drop, or both in the image, the video, or both.

A method for printing an object is also disclosed. The method includes jetting a first drop and a second drop through a nozzle of a printer at a first frequency. The method also includes illuminating the first and second drops with a light source as the first and second drops descend from the nozzle. The light source emits first and second pulses of light at a second frequency. The first pulse of light illuminates the first drop. The second pulse of light illuminates the second drop. The first and second frequencies are substantially synchronized. The method also includes capturing a first image of the first drop and a second image of the second drop as the first and second drops descend from the nozzle. The method also includes detecting one or more blobs in the first image. A first of the one or more blobs corresponds to the first drop. The method also includes characterizing the first drop by determining a size difference between a size of the first drop and a mean size of the first and second drops in the first and second images, determining a location difference between a location of the first drop and a mean location of the first and second drops in the first and second images, or both. The method also includes adjusting one or more parameters of the printer based at least partially upon the size difference, the location difference, or both.

A method for characterizing a plurality of drops that are descending from a nozzle of a printer is also disclosed. The method includes jetting the drops through the nozzle at a first frequency. The method also includes illuminating the drops with a light source as the drops descend from the nozzle. The light source emits a plurality of pulses of light at a second frequency. The first and second frequencies are substantially synchronized such that each pulse of light illuminates one of the drops. The method also includes capturing a plurality of images of the drops as the drops descend from the nozzle. The images include a plurality of light images and a plurality of dark images. The light images are captured while the pulses of light illuminate the drops such that each of the light images includes at least one of the drops that is visible. The dark images are captured between the pulses of light. The method also includes determining a mean intensity of each of the images. The method also includes selecting the light images based at least partially upon the mean intensity. The mean intensity of the light images is greater than a predetermined intensity threshold. The mean intensity of the dark images is less than the predetermined intensity threshold. The method also includes detecting a plurality of blobs in a first of the light images. A first of the blobs corresponds to a first of the drops. The method also includes determining that a second of the blobs does not correspond to the first drop because the second blob is in the same location in the light images, indicating that the second blob is stationary and not descending. The method also includes determining that a third of the blobs does not correspond to the first drop because the third blob appears only in a subset of the light images. The method also includes determining a first region of interest in the first light image that includes the first blob. The method also includes determining a first mean intensity inside of the first blob and a second mean intensity outside of the first blob. The method also includes determining that the first blob corresponds to the first drop based at partially upon a contrast between the first and second mean intensities being greater than a predetermined contrast threshold. The method also includes determining a second region of interest within the first region of interest. The second region of interest includes the first drop. The method also includes performing Canny edge detection, binary closing, and contour detection within the second region of interest to produce a binary mask that corresponds to the first drop. The method also includes characterizing the first drop by determining a size difference between a size of the first drop in the first image and a mean size of the drops based at least partially upon the binary mask, and determining a location difference between a location of the first drop in the first image and a mean location of the drops based at least partially upon the binary mask. The method also includes adjusting one or more parameters of the printer based at least partially upon the size difference and the location difference.

A 3D printer is also disclosed. The 3D printer includes a nozzle configured to jet a drop of liquid metal therethrough. The 3D printer also includes a light source configured to illuminate the drop with a pulse of light. A duration of the pulse of light is from about 0.0001 seconds to about 0.1 seconds. The 3D printer also includes a camera configured to capture an image, video, or both of the drop. The 3D printer also includes a computing system configured to detect the drop in the image, the video, or both. The computing system is also configured to characterize the drop after the drop is detected. Characterizing the drop includes determining a size of the drop, a location of the drop, or both in the image, the video, or both.

A 3D printer configured to print a 3D object is also disclosed. The 3D printer includes a nozzle configured to jet a first drop and a second drop therethrough at a first frequency. The first and second drops include liquid metal. The 3D printer also includes a light source configured to illuminate the first and second drops as the first and second drops descend from the nozzle. The light source emits first and second pulses of light at a second frequency. The first pulse of light illuminates the first drop. The second pulse of light illuminates the second drop. The first and second frequencies are substantially synchronized. The 3D printer also includes a camera configured to capture a first image of the first drop and a second image of the second drop as the first and second drops descend from the nozzle. The 3D printer also includes a computing system configured to detect one or more blobs in the first image. A first of the one or more blobs corresponds to the first drop. The computing system is also configured to characterize the first drop by determining a size difference between a size of the first drop and a mean size of the first and second drops in the first and second images, determining a location difference between a location of the first drop and a mean location of the first and second drops in the first and second images, or both. The computing system is also configured to adjust one or more parameters of the 3D printer based at least partially upon the size difference, the location difference, or both.

A 3D printer configured to print a 3D object by jetting a plurality of drops of liquid metal of onto a substrate is disclosed. The 3D printer includes a nozzle configured to jet the drops therethrough at a first frequency. The drops comprise include aluminum. The 3D printer also includes a light source configured to illuminate the drops as the drops descend from the nozzle. The light source emits a plurality of pulses of light at a second frequency. The first and second frequencies are substantially synchronized such that each pulse of light illuminates one of the drops. The 3D printer also includes a camera configured to capture a plurality of images of the drops as the drops descend from the nozzle. The images include a plurality of light images and a plurality of dark images. The light images are captured while the pulses of light illuminate the drops such that each of the light images includes at least one of the drops that is visible. The dark images are captured between the pulses of light. The 3D printer also includes a computing system configured to determine a mean intensity of each of the images. The computing system is also configured to select the light images based at least partially upon the mean intensity. The mean intensity of the light images is greater than a predetermined intensity threshold. The mean intensity of the dark images is less than the predetermined intensity threshold. The computing system is also configured to detect a plurality of blobs in a first of the light images. A first of the blobs corresponds to a first of the drops. The computing system is also configured to determine that a second of the blobs does not correspond to the first drop because the second blob is in the same location in the light images, indicating that the second blob is stationary and not descending. The computing system is also configured to determine that a third of the blobs does not correspond to the first drop because the third blob appears only in a subset of the light images. The computing system is also configured to determine a first region of interest in the first light image that includes the first blob. The computing system is also configured to determine a first mean intensity inside of the first blob and a second mean intensity outside of the first blob. The computing system is also configured to determine that the first blob corresponds to the first drop based at partially upon a contrast between the first and second mean intensities being greater than a predetermined contrast threshold. The computing system is also configured to determine a second region of interest within the first region of interest, wherein the second region of interest includes the first drop. The computing system is also configured to perform Canny edge detection, binary closing, and contour detection within the second region of interest to produce a binary mask that corresponds to the first drop. The computing system is also configured to characterize the first drop by determining a size difference between a size of the first drop in the first image and a mean size of the drops based at least partially upon the binary mask, and determining a location difference between a location of the first drop in the first image and a mean location of the drops based at least partially upon the binary mask. The computing system is also configured to adjust one or more parameters of the 3D printer based at least partially upon the size difference and the location difference.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
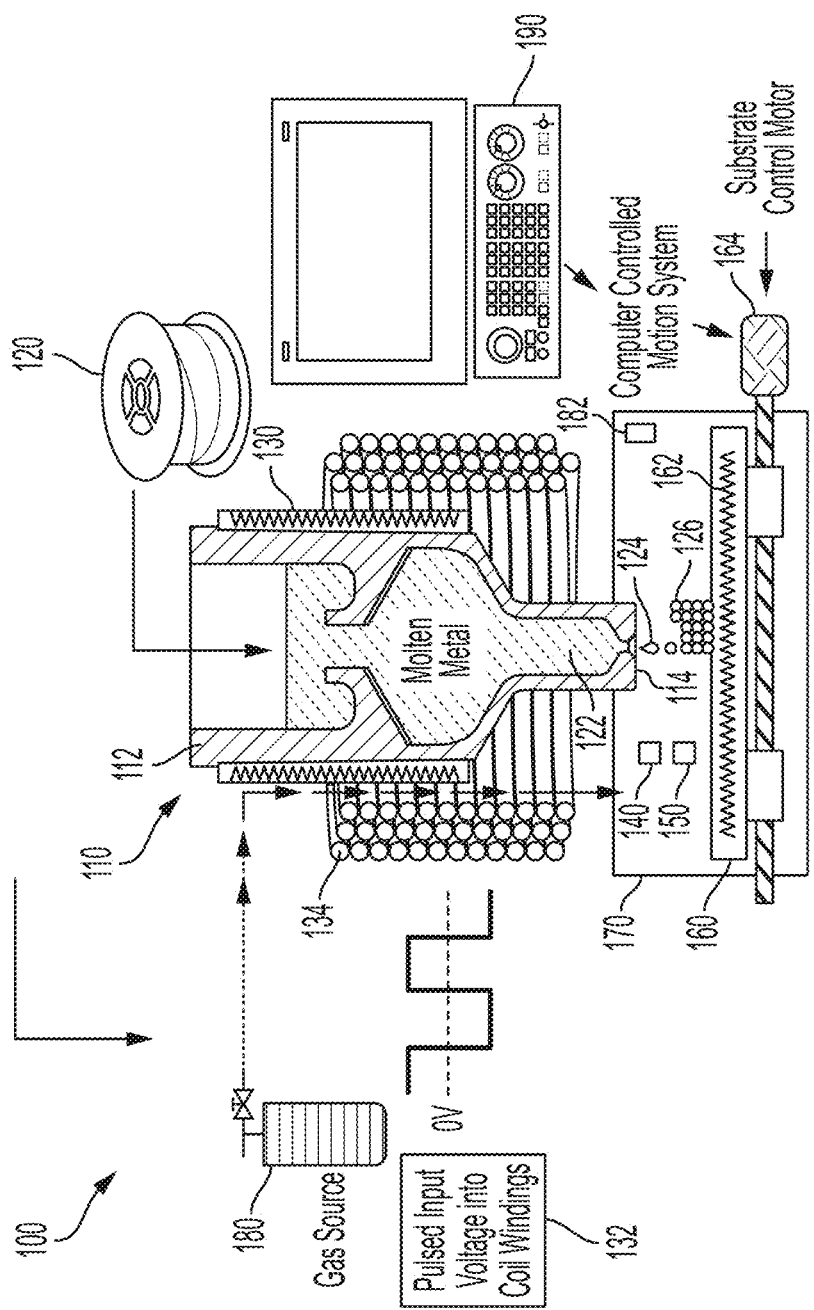
FIG. 1 depicts a schematic cross-sectional view of a 3D printer, according to an embodiment.

FIG. 1 depicts a schematic cross-sectional view of a 3D printer 100, according to an embodiment. The 3D printer 100 may include an ejector (also referred to as a pump chamber) 110. The ejector 110 may define an inner volume that is configured to receive a printing material 120. The printing material 120 may be or include a metal, a polymer, or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more drops 124.

The 3D printer 100 may also include one or more cameras (one is shown: 140) that is/are configured to capture video and/or images of the nozzle 114, the drops 124, or both. In one embodiment, the video may include signals derived from a sequence of images. In another embodiment, the images may be or include frames of the video. The camera 140 may be or include a low-speed camera that is configured to capture the video and/or images at a rate of about 20 frames per second to about 100 frames per second or about 30 frames per second to about 60 frames per second. In one embodiment, front face monitoring during the jetting of the drops may be triggered by the 3D printer 100 as a normal checkup, operator intervention, detection of irregular jetting, and/or by detection of greater than usual deviations of the 3D printer 100.

The 3D printer 100 may also include one or more light sources (one is shown: 150) that is/are configured to shine light on the nozzle 114, the drops 124, or both. The light source 150 may be or include a strobe light that is configured to emit discrete pulses of light. In one embodiment, the frequency of the pulses of light from the strobe light 150 may be substantially synchronized with the frequency of the jetting of the drops 124 through the nozzle 114. As a result, the drops 124 may appear in substantially the same location in each frame of the video that is illuminated by a pulse of light from the light source 150.

The 3D printer 100 may also include a substrate (also referred to as a build plate) 160 that is positioned below the nozzle 114. The drops 124 that are jetted through the nozzle 114 may land on the substrate 160 and cool and solidify to produce a 3D object 126. The substrate 160 may include a heater 162 therein that is configured to increase the temperate of the substrate 160. The 3D printer 100 may also include a substrate control motor 164 that is configured to move the substrate 160 as the drops 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

In one embodiment, the 3D printer 100 may also include an enclosure 170. The enclosure 170 may be positioned at least partially around the ejector 110, the nozzle 114, the drops 124, the 3D object 126, the heating elements 130, the coils 134, the camera 140, the light source 150, the substrate 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the drops 124, the 3D object 126, and/or the substrate 160.

The 3D printer 100 may also include a gas sensor 182. The gas sensor 182 may be positioned within the enclosure 170. The gas sensor 182 may also or instead be positioned proximate to the drops 124, the 3D object 126, and/or the substrate 160 (e.g., in an embodiment where the enclosure 170 is omitted). The gas sensor 182 may be configured to measure a concentration of the gas (e.g., from the gas source 180), oxygen, or a combination thereof.

The 3D printer 100 may also include a computing system 190. The computing system 190 may be configured to control the introduction of the printing material 120 into the ejector 110, the heating elements 130, the power source 132, the camera 140, the light source 150, the substrate control motor 164, the gas source 180, the gas sensor 182, or a combination thereof. For example, the computing system 190 may be configured to synchronize the frequency of the light source 150 with the frequency at which the drops 124 are jetted through the nozzle 114. The computing system 190 may also be configured to receive the video from the camera 140 and to detect and characterize the drops 124 in the video. The computing system 190 may also be configured to adjust one or more parameters of the 3D printer 100 based at least partially upon the detection and/or characterization of the drops 124. The detection and characterization of the drops 124 and/or the adjustment of the parameters may be part of a real-time closed loop control system provided by the computing system 190.

Figure 2:
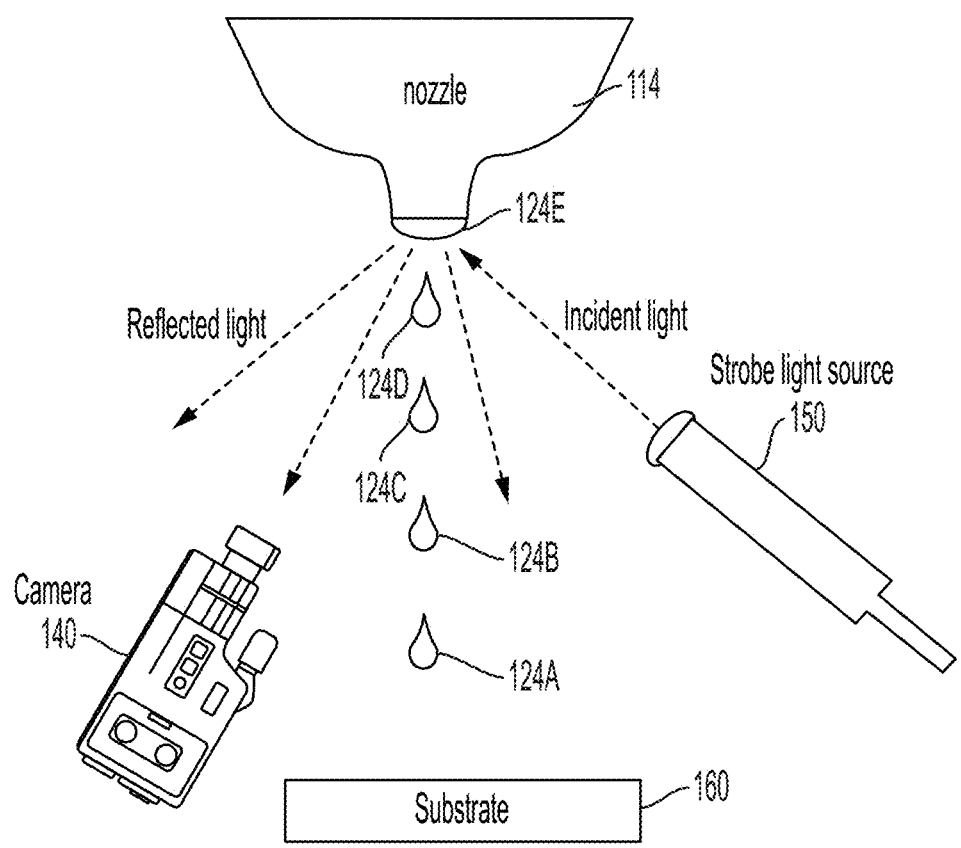
FIG. 2 depicts a side view of a portion of FIG. 1, according to an embodiment.

FIG. 2 depicts a side view of a portion of FIG. 1, according to an embodiment. More particularly, FIG. 2 depicts a side view of the nozzle 114, the camera 140, and the light source 150. In FIG. 2, five drops 124A-124E of the liquid printing material 120 are shown. The drop 124E is positioned at least partially within the nozzle 114, and the drops 124A-124D have already been jetted from the nozzle 114 and are descending toward the substrate 160.

The camera 140 and/or the light source 150 may be directed at/toward the nozzle 114, the drops 124A-124E, the substrate 160, or a combination thereof. More particularly, the camera 140 and/or the light source 150 may be directed at/toward the drops 124A-124D as they descend from the nozzle 114 (e.g., after they have been jetted from the nozzle 114 and before they land on the substrate 160). As mentioned above, the frequency of the light source 150 may be substantially synchronized with the frequency of the jetting of the drops 124A-124E. Thus, in the example of FIG. 2, the light source 150 may emit five pulses of light that correspond to the five drops 124A-124E. This is described in greater detail below.

Figure 3:
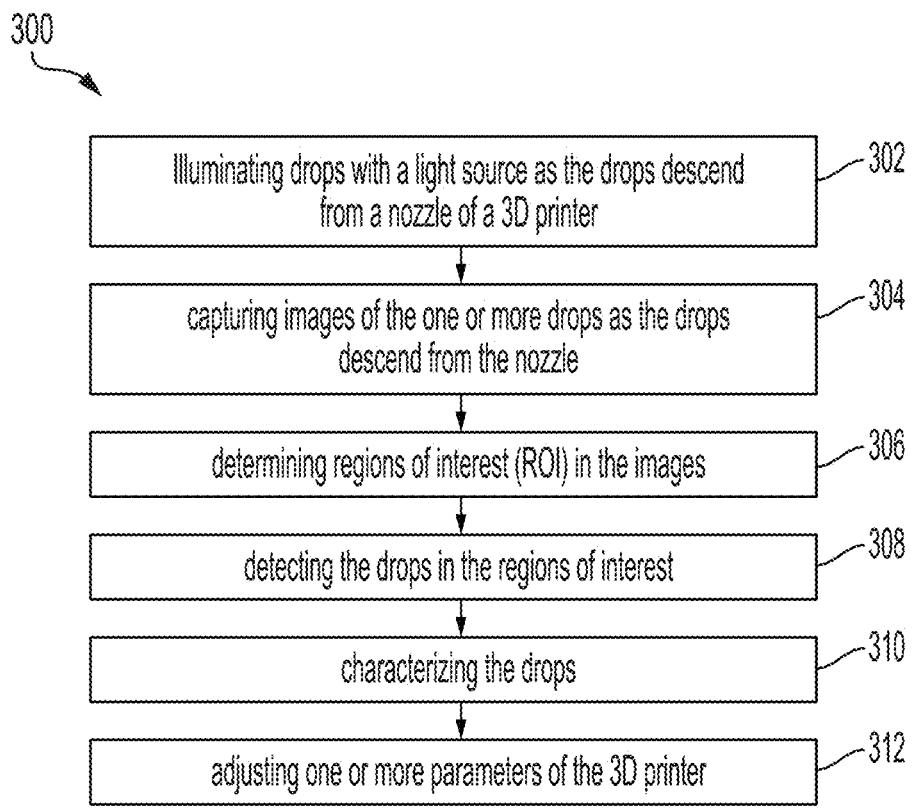
FIG. 3 depicts a flowchart of a method for printing a 3D object, according to an embodiment.

FIG. 3 depicts a flowchart of a method 300 for printing the 3D object 126, according to an embodiment. The method 300 is particularly applicable to liquid metal drops 124A-124E in 3D printing applications (as opposed to non-metal drops and/or non 3D printing applications) because metallic drops produce specular highlights, and analysis of these specular highlights provided by the method 300 may provide information and insight into the behavior (e.g., the movement and/or oscillation) of the surface of the liquid metal drops 124A-124E. The behavior may be directly related to the stability of the drops 124A-124E, which in turn affects the quality of the 3D object 126.

The method 300 is also particularly applicable to liquid metal drops 124A-124E in 3D printing applications (as opposed to non-metal drops and/or non 3D printing applications) because liquid metal has a higher surface tension than conventional ink. Liquid metal may have a surface tension that is from about 0.1 N/m to about 0.5 N/m, about 0.5 N/m to about 1.0 N/m, about 1.1 N/m to about 1.5 N/m, about 1.5 N/m to about 2.0 N/m, or more. For example, liquid aluminum may have a surface tension from about 0.8 N/m to about 0.9 N/m. In another example, stainless steel may have a surface tension from about 1.5 N/m to about 1.9 N/m. In yet another example, copper may have a surface tension from about 1 N/m to about 1.4 N/m. Conventional ink has a surface tension from about 0.03 N/m and about 0.07 N/m. The higher surface tensions mean that the drops 124A-124E of the liquid metal have a "tighter" meniscus than conventional ink. As a result, the diameter of the nozzle 114 is designed to be larger than conventional nozzles because the force to jet a drop decreases as the diameter of the nozzle increases. For example, the nozzle 114 may have a diameter from about 100 micrometers to about 1000 micrometers, about 250 micrometers to about 700 micrometers, or about 350 micrometers to about 600 micrometers, while conventional nozzles may have a diameter from about 10 micrometers to about 50 micrometers.

The larger meniscus and/or larger nozzle 114 mean that it's more practical to acquire the high-speed images and/or video used by the method 300. More particularly, this facilitates obtaining a sufficient magnification and sufficient light per video frame. The larger meniscus and/or larger nozzle 114 may also lower the resonant frequency, meaning that acquiring the video and/or images at a sufficient frame rate is more practical. For example, the resonant frequency for liquid metal printing in the 3D printer 100 may be from about 100 Hz to about 60 kHz, about 500 Hz to about 20 kHz, or about 800 Hz to about 1.2 kHz, and the resonant frequency in conventional ink printers may be from about 80 kHz to about 120 kHz. In summary, due to the ~20× higher surface tension of liquid metal, the nozzle 114 may be larger than conventional nozzles, the drops 124A-124E may be larger than conventional drops, and the meniscus resonant frequency may be lower than the meniscus resonant frequency of conventional drops, which all make acquiring the video and/or images more practical. Moreover, the larger drops 124A-124E are easier to see and identify against the background, as described below.

An illustrative order of the method 300 is provided below; however, one or more steps of the method 300 may be performed in a different order, performed simultaneously, repeated, or omitted. One or more steps of the method 300 may be performed (e.g., automatically) by the computing system 190.

The method 300 may include illuminating one or more drops 124A-124E with a light source 150, as at 302. The drops 124A-124E may be illuminated as the drops 124A-124E descend from the nozzle 114 of the printer 100 (e.g., toward the substrate 160). As mentioned above, the light source 150 may be a strobe light that emits pulses of light (e.g., on, off, on, off, etc.) at a predetermined frequency that is substantially the same as the frequency at which the drops 124A-124E are jetted through the nozzle 114. For example, the frequency (of the light pulses and/or the jetting of the drops 124A-124E) may be from about 30 Hz to about 500 Hz, about 50 Hz to about 400 Hz, or about 100 Hz to about 300 Hz. As used herein, "substantially the same frequency" refers to within about 20 Hz, within about 10 Hz, or within about 5 Hz. The duration of each light pulse and/or the jetting of each drop 124A-124E may be from about 0.0001 seconds to about 0.001 seconds, about 0.001 seconds to about 0.01 seconds, or about 0.01 seconds to about 0.1 seconds.

Thus, a first pulse of light may be emitted from the light source 150 that illuminates the drop 124A as the drop 124A is descending, a second pulse of light may be emitted from the light source 150 that illuminates the drop 124B as the drop 124B is descending, and so on. The first pulse of light may be emitted before or after the drop 124B is jetted. The second pulse of light may be emitted before or after the drop 124A lands (e.g., on the substrate 160).

The method 300 may also include capturing images of the one or more drops 124A-124E, as at 304. In one embodiment, this step may also or instead include capturing video of one or more drops 124A-124E, and the images may be or include frames from the video. The images and/or video may be captured as the drops 124A-124E are descending from the nozzle 114 of the printer 100 (e.g., toward the substrate 160).

Figure 4:
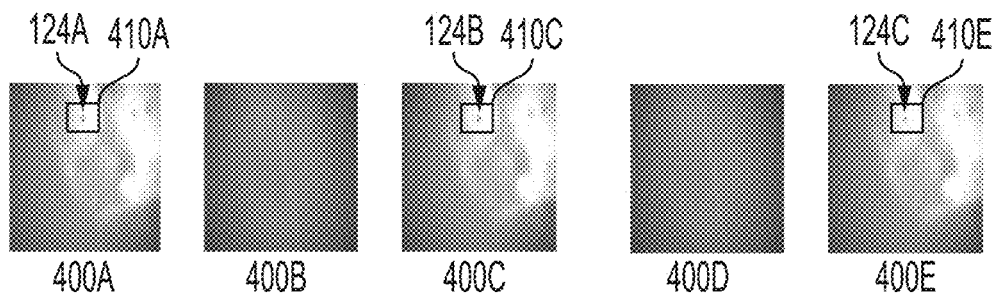
FIG. 4 depicts five consecutive images (e.g., frames of a video) of drops descending from a nozzle of the 3D printer, according to an embodiment.

FIG. 4 depicts five consecutive images 400A-400E, according to an embodiment. The images 400A-400E may include a first light image 400A, followed by a first dark image 400B, followed by a second light image 400C, followed by a second dark image 400D, followed by a third light image 400E, and so on. The light images (also referred to as valid images or valid frames) 400A, 400C, 400E may occur when the light source 150 is pulsed on, and the dark images 400B, 400D may occur when the light source 150 is pulsed off.

The drop 124A may be visible in the first light image 400A. The drop 124B may or may not be visible in the first light image 400A. The drop 124B may be visible in the second light image 400C. The drops 124A, 124C may or may not be visible in the second light image 400C. The drop 124C may be visible in the third light image 400E. The drops 124A, 124B, 124D may or may not be visible in the third light image 400E. No drops may be visible (or the drops may be less visible) in the dark images 400B, 400D. In one embodiment, no drops may be present (e.g., descending) when the dark images 400B, 400D are captured.

In one embodiment, the location of the drop 124A in the first light image 400A may be substantially the same as the location of the drop 124B in the second light image 400C, and/or the location of the drop 124C in the third light image 400E (e.g., due to the frequencies being substantially synchronized). As used herein, "substantially the same location" may be within less than or equal to about 10 pixels, 5 pixels, 3 pixels, or it may refer to the same pixel in two different images. However, non-uniform jetting (i.e., drop jitter) may cause the locations to vary, which may be detected below.

The method 300 may also include determining regions of interest (ROI) 410A, 410C, 410E in the images 400A-400E, as at 306. More particularly, this may include determining one or more regions of interest 410A, 410C, 410E in the light images 400A, 400C, 400E. Each region of interest 410A, 410C, 410E may have one of the drops 124A-124C located therein. Determining the regions of interest 410A, 410C, 410E may help to remove or discard any other objects in the images 400A, 400C, 400E (e.g., whose features may be similar in appearance to the drops 124A, 124B, 124C).

Determining the regions of interest 410A, 410C, 410E may include identifying and extracting the light images (i.e., valid frames) 400A, 400C, 400E from the images 400A-400E. The light images 400A, 400C, 400E may be identified and extracted using a threshold on the mean intensity in the images 400A-400E. The mean intensity of the light images 400A, 400C, 400E may be greater than a predetermined pixel threshold (e.g., 120 on a scale from 0-255).

Determining the regions of interest 410A, 410C, 410E may also include detecting objects (e.g., blobs) in the light images 400A, 400C, 400E. As used herein, a blob refers to a group of pixels that may or may not correspond to the drop 124A. In one example, a blob may have substantially the same size as the drop 124A. The following portion of the method 300 distinguishes blobs that correspond to the drops from blobs that do not correspond to the drops. The blobs may be detected using a (e.g., naïve) blob detection technique on the light images 400A, 400C, 400E.

Figure 5:
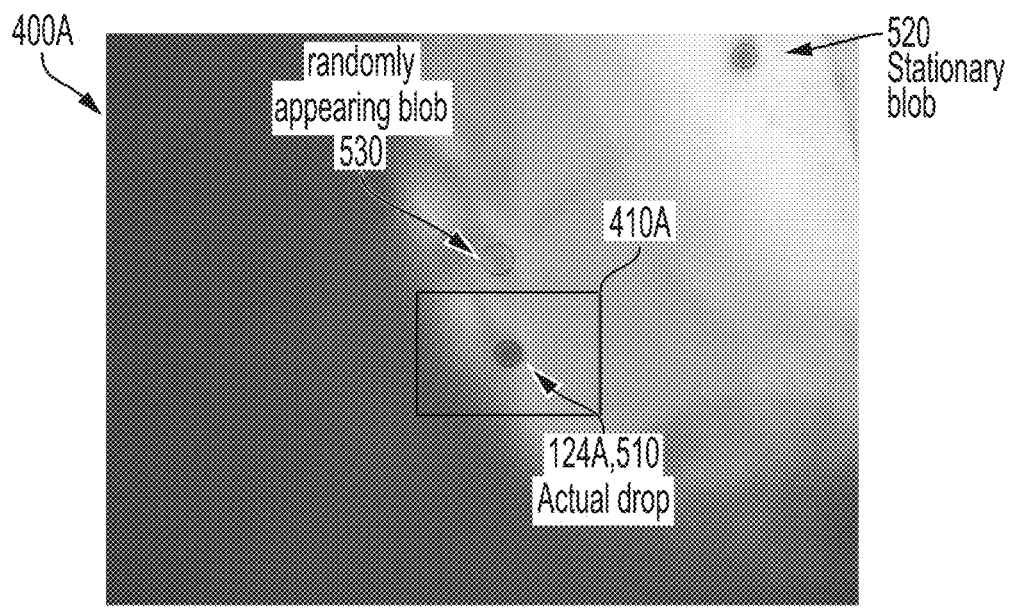
FIG. 5 depicts a region of interest in one of the images, according to an embodiment.

FIG. 5 depicts a portion of the image 400A including the region of interest 410A, according to an embodiment. Some of the identified blobs (e.g., blob 510) may genuinely represent the drop 124A, and some of the blobs (e.g., blobs 520, 530) may be outliers (i.e., they may not represent the drop 124A). In a first example, the outlier blobs may be or include stationary blobs 520 with substantially the same size that consistently appear in most or all of the light frames 400A, 400C, 400E, beyond what is normally expected of the drops 124A, 124B, 124C. In a second example, the outlier blobs may be or include blobs 530 that randomly appear in a subset of the light images 400A, 400C, 400E. The blobs 520, 530 in these two examples do not correspond to the drop 124A.

To address the first example, a graph (e.g., a histogram) of the coordinates of the centers of the stationary blobs 520 may be generated to determine whether the stationary blobs 520 with substantially the same size appear consistently in the same region of a predetermined percentage (e.g., a majority) of the regions of interest 410A, 410C, 410E in the light frames 400A, 400C, 400E. The blobs 520 that have a histogram count that is greater than a predetermined threshold (e.g., identified in 70% or more of the light images 400A, 400C, 400E) may be determined to not represent the drops 124A-124C, and thus they may be discarded. After the stationary blobs 520 are discarded, a mean and/or variance of the center coordinates of the remaining blobs 510, 530 may be used to address the second example (i.e., to identify and discard randomly appearing blobs 530 in the region of interest 410A that do not represent the drop 124A). The remaining blobs 510 may genuinely include or represent the drop 124A.

Determining the regions of interest 410A, 410C, 410E may also include averaging the center coordinates of the remaining blobs (e.g., blob 510) to determine the centers of the regions of interest 410A, 410C, 410E. Once the centers of the regions of interest 410A, 410C, 410E have been determined, bounding boxes of the regions of interest 410A, 410C, 410E may be determined around the centers. In one example, the (e.g., bounding boxes of the) regions of interest 410A, 410C, 410E may have a height of 400 pixels and a width of 300 pixels. The regions of interest 410A, 410C, 410E may then be extracted from the light images 400A, 400C, 400E.

The method 300 may also include detecting the drops 124A-124C in the regions of interest 410A, 410C, 410E, as at 308. This may include using an object (e.g., blob) detection technique on the regions of interest 410A, 410C, 410E to detect blobs in the regions of interest 410A, 410C, 410E. The blob detection technique used in step 308 may be the same as that used in step 306, or it may be a different blob detection technique.

Some of the identified blobs in the regions of interest 410A, 410C, 410E may genuinely represent the drops 124A-124C, and some of the blobs may be outliers (i.e., they may not represent the drops 124A-124C). The drops 124A-124C may have a high intensity contrast between the regions inside the drops 124A-124C and the regions outside of the drops 124A-124C. In contrast, the outlier blobs may have a lower intensity contrast. Thus, to identify the outlier blobs, the mean intensity inside and outside of each blob may be determined. For example, the mean intensity may be described by: $r<R<r+20$, where R represents the region of interest 410A, 410C, 410E, and r represents the radius of the blob. The blobs with an intensity contrast that is greater than a predetermined pixel threshold (e.g., 20 on a scale from 0-255) may be determined to be the drops 124A-124C, and the blobs with an intensity contrast that is less than the predetermined threshold may be determined to be outlier blobs. The outlier blobs may be discarded.

The method 300 may also include characterizing the drops 124A-124C, as at 310. This may include characterizing one or more properties of the drops 124A-124C. The properties may be or include the sizes (e.g., diameters, volumes, etc.) of the drops 124A-124C, the locations of the drops, 124A-124C, the displacement of the drops 124A-124C, or a combination thereof. As used herein, the displacement of the drops 124A-124C refers to the distance between the drop center and the mean drop center computed over multiple (e.g., all) frames.

Figure 6:
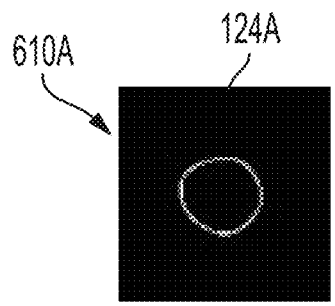
FIG. 6 depicts a smaller region of interest, within the larger region of interest from FIG. 5, that includes a drop, according to an embodiment.

Characterizing the drops 124A-124C may include determining one or more (e.g., smaller) regions of interest within each (e.g., larger) region of interest 410A, 410C, 410E. FIG. 6 depicts a smaller region of interest 610A, within the larger region of interest 410A, that includes the drop 124A, according to an embodiment. In one example, the smaller region of interest 610A may have a height of 120 pixels and a width of 120 pixels.

Figure 7:
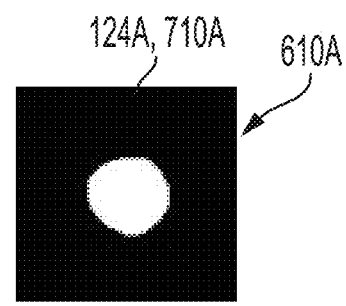
FIG. 7 depicts the smaller region of interest including a binary mask that represents (e.g., overlaps) the drop, according to an embodiment.
Figures 8A, 8B, 8C:
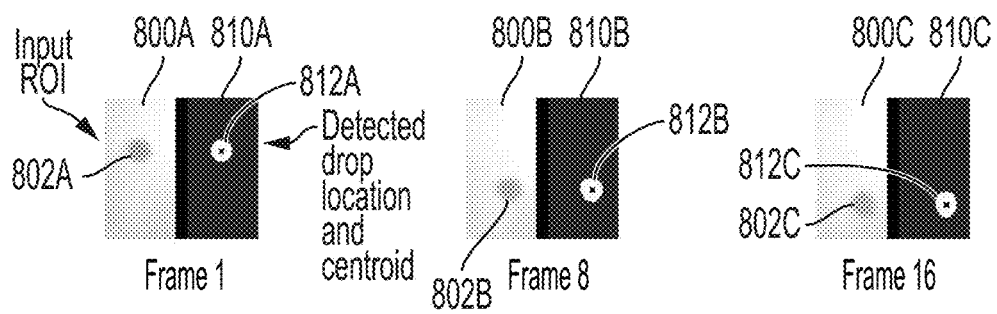
FIGS. 8A-8E depict an original set of (e.g., smaller) regions of interest and a corresponding processed set of the (e.g., smaller) regions of interest, according to an embodiment.
Figure 8D:
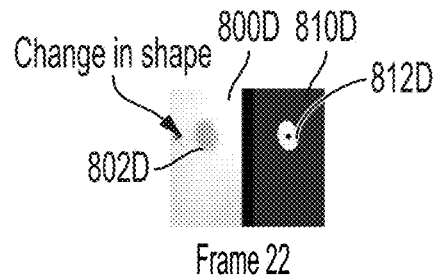
Figure 8E:
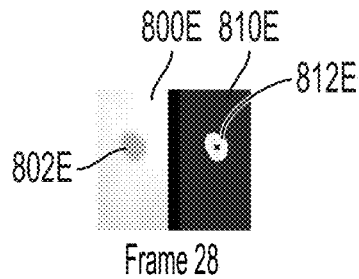

Characterizing the drops 124A-124C may also include performing Canny edge detection, binary closing, contour detection, or a combination thereof on the smaller region of interest 610A to produce a binary mask. In one example, the Canny edge detection, the binary closing, and the contour detection may be performed sequentially. As shown in FIG. 6, the Canny edge detection may be used to detect the edge/boundary of the drop 124A. Also shown in FIG. 6, the binary closing and contour detection may be used to fill any holes in the drop boundary from the Canny algorithm and create a smooth connected boundary. FIG. 7 depicts the smaller region of interest 610A including the binary mask 710A, according to an embodiment. The binary mask 710A may represent (e.g., overlap) the drop 124A. The binary mask 710A may be produced by converting the pixels inside of the edge to the first binary state (e.g., white).

FIGS. 8A-8E depict an original set of (e.g., smaller) regions of interest 800A-800E and a corresponding processed set of the regions of interest 810A-810E, according to an embodiment. The original set of (e.g., smaller) regions of interest 800A-800E may occur before the Canny edge detection, binary closing, contour detection, or a combination thereof. The original set of (e.g., smaller) regions of interest 800A-800E may include blobs 802A-802E that correspond to drops.

The processed set of the regions of interest 810A-810E may occur after the Canny edge detection, binary closing, contour detection, or a combination thereof. Thus, the processed set of the regions of interest 810A-810E may each include a binary mask 812A-812E that represents (e.g., overlaps the drops) and a center 814A-814E of the binary mask 812A-812E.

Although the blobs 802A-802C and the binary masks 812A-812C are substantially circular, the blobs 802D, 802E and the binary masks 812D, 812E may have irregular shapes. The method 300 is robust even when the shapes vary (e.g., when the shapes are non-circular) because it relies only on finding and connecting the drop boundary based on image gradients, and there is no implicit or explicit restriction on the shape of the object.

Characterizing the drops 124A-124C may also include determining sizes of the drops 124A-124C. The sizes of the drops 124A-124C may be determined based at least partially upon the smaller regions of interest (e.g., 610A), the edges, the binary masks (e.g., 710A), or a combination thereof. The sizes of the drops 124A-124C may include the diameters of the drops 124A-124C, the areas of the drops 124A-124C, the volume of the drops 124A-124C, or a combination thereof.

Figure 9:
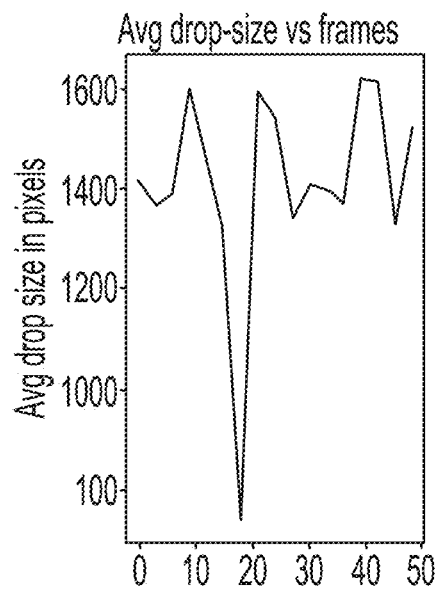
FIG. 9 depicts a graph showing the difference between the volume of each drop and the mean volume, according to an embodiment.

Characterizing the drops 124A-124C may also include determining a mean volume of the drops 124A-124C. The mean volume may be determined in the images 400A, 400C, 400E, in the larger regions of interest 410A, 410C, 410E, in the smaller regions of interest 610A, or a combination thereof. The difference between the volume of each drop 124A-124C and the mean volume may then be determined. FIG. 9 depicts a graph showing the difference between the volume of each drop 124A-124C and the mean volume, according to an embodiment. The X axis represents 50 consecutive light images/frames, and the Y axis represents the average drop size (e.g., in pixels).

Figure 10:
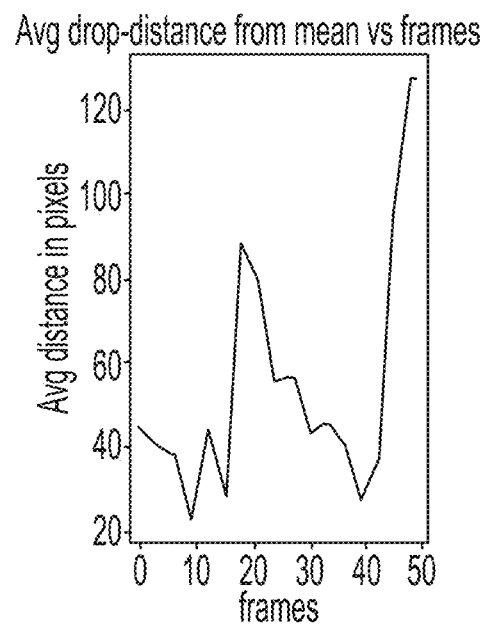
FIG. 10 depicts a graph showing the difference between the location of each drop and the mean location, according to an embodiment.

Characterizing the drops 124A-124C may also include determining a mean location of the drops 124A-124C. The mean location may be determined in the images 400A, 400C, 400C, in the larger regions of interest 410A, 410C, 410E, in the smaller regions of interest 610A, or a combination thereof. The distance between the location of each drop 124A-124C and the mean location may then be determined. FIG. 10 depicts a graph showing the difference between the location of each drop 124A-124C and the mean location, according to an embodiment. The X axis represents 50 consecutive light images, and the Y axis represents the average difference (e.g., in pixels).

Figure 11:
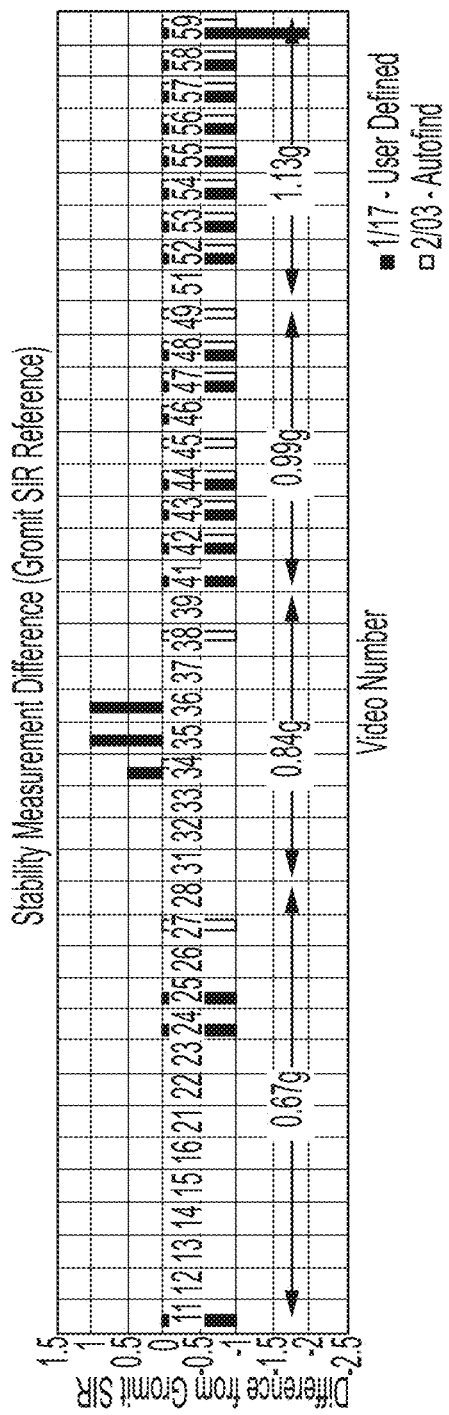
FIG. 11 depicts drop displacements determined by the method versus drop displacements determined by experts (e.g., using conventional manual/visual techniques) on the same images, according to an embodiment.

FIG. 11 depicts drop displacements determined by the method 300 versus drop displacements determined by experts (e.g., using conventional manual/visual techniques) on the same images, according to an embodiment. As may be seen, the drop displacements determined by the method 300 are in good agreement with the drop displacements determined by the experts, suggesting that the method 300 is accurate. The method 300, however, may be performed faster and require less man hours than the conventional technique.

Figure 12A:
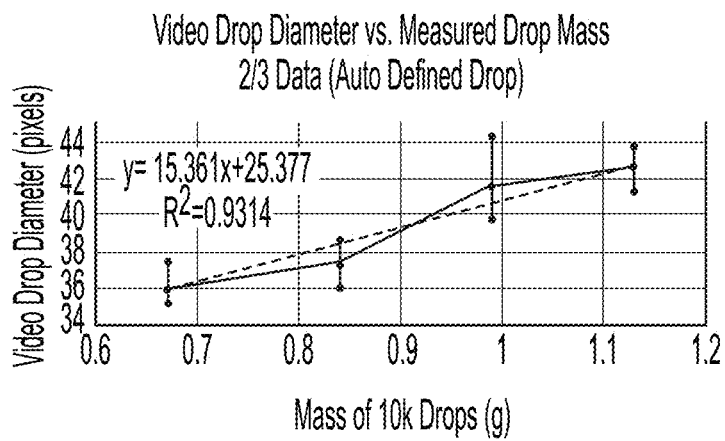
FIG. 12A depicts a correlation between true drop mass and drop diameter determined by the method.
Figure 12B:
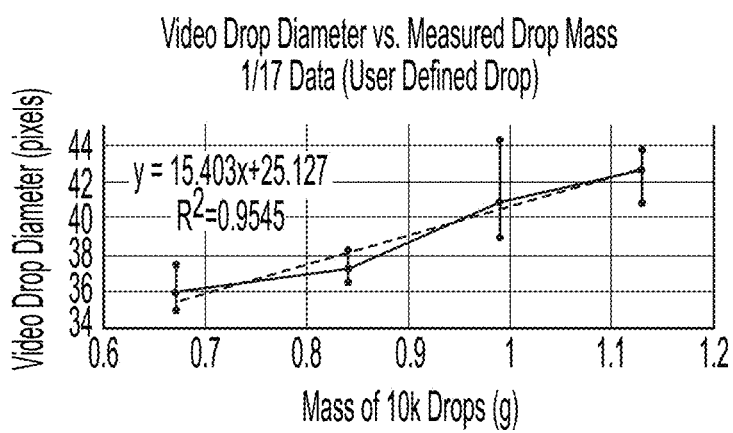
FIG. 12B depicts a correlation between true drop mass and drop diameter determined by experts (e.g., using conventional manual/visual techniques) on the same images, according to an embodiment.

FIG. 12A depicts a correlation between true drop mass and drop diameter determined by the method 300, and FIG. 12B depicts a correlation between true drop mass and drop diameter determined by experts (e.g., using conventional manual/visual techniques) on the same images, according to an embodiment. As may be seen, the correlation determined by the method 300 is in good agreement with the correlation determined by the experts, demonstrating that the method 300 may serve as a reliable quantitative proxy for subjective assessment of drop jetting characteristics. The method 300, however, may be performed faster and require less man hours than the conventional technique.

The method 300 may also include adjusting one or more parameters of the 3D printer 100, as at 312. The parameters may be adjusted based at least partially upon the detection the drops 124A-124C in the regions of interest 410A, 410C, 410E (at 308), the characterization of the drops 124A-124C (at 310), or both. In another embodiment, the parameters may be adjusted based at least partially upon the sizes of the drops 124A-124C, the locations of the drops 124A-124C, the displacement of the drops 124A-124C, or a combination thereof. In yet another embodiment, the parameters may be adjusted based at least partially upon the difference between the volume of each drop 124A-124C and the mean volume, the difference between the location of each drop 124A-124C and the mean location, or both.

The parameters to be adjusted may be or include power (e.g., voltage, current, frequency, pulse length, voltage vs time waveform, etc.) provided to the coils 134 by the power source 132. The parameters may also or instead include the frequency of the pulses of light from the light source 150, the frequency at which the images 400A-400E are captured (e.g., the frame rate of the video), or both. The parameters may also or instead include the amount of heat generated by the heating elements 130, the temperature of the liquid printing material 120 (e.g., the drops 124A-124E), the size of the drops 124A-124E, the frequency at which the drops 124A-124E are jetted, or a combination thereof.

In one example, in response to the difference between the volume of each drop 124A-124C and the mean volume being greater than a predetermined threshold, the power delivered to the coils 134 may be varied (e.g., reduced). In another example, in response to the difference between the location of each drop 124A-124C and the mean location is greater than a predetermined threshold, the power delivered to the coils 134 may be varied (e.g., reduced).

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method, comprising:
   illuminating a drop with a pulse of light from a light source, wherein a duration of the pulse of light is from about 0.0001 seconds to about 0.1 seconds;
   capturing an image, video, or both of the drop;
   detecting the drop in the image, the video, or both; and
   characterizing the drop after the drop is detected, wherein characterizing the drop comprises determining a size of the drop, a location of the drop, or both in the image, the video, or both, and wherein characterizing the drop produces a binary mask that represents the drop.

2. The method of claim 1, wherein the drop is illuminated with the pulse of light from the light source as the drop descends from a nozzle of a printer.

3. The method of claim 2, wherein the image, the video, or both are captured while the drop is illuminated with the pulse of light and while the drop descends from the nozzle of the printer.

4. The method of claim 3, wherein illuminating the drop with the pulse of light comprises illuminating a plurality of drops with a plurality of pulses of light, wherein a frequency of the pulses of light is substantially the same as a frequency at which the drops are jetted through the nozzle of the printer.

5. The method of claim 4, wherein the frequency of the pulses of light and the frequency at which the drops are jetted are between about 50 Hz to about 400 Hz.

6. The method of claim 1, wherein detecting the drop comprises:
   detecting a blob in the image, the video, or both;
   determining an intensity inside the blob;
   determining an intensity outside of the blob; and
   determining that the blob corresponds to the drop in response to a difference between the intensities being greater than a predetermined threshold.

7. The method of claim 1, wherein characterizing the drop comprises sequentially performing Canny edge detection, binary closing, and contour detection on the image, the video, or both to produce the binary mask that represents the drop, and wherein the size of the drop, the location of the drop, or both are determined based at least partially upon the binary mask.

8. The method of claim 1, wherein characterizing the drop comprises generating a graph that shows a size difference between the size of the drop in the image, the video, or both and a mean size of a plurality of other drops.

9. The method of claim 1, wherein characterizing the drop comprises generating a graph that shows a location difference between the location of the drop in the image, the video, or both and a mean location of a plurality of other drops.

10. The method of claim 1, further comprising adjusting one or more parameters of a printer that jetted the drop based at least partially upon the characterization of the drop.

11. The method of claim 1, wherein characterizing the drop comprises performing Canny edge detection to produce the binary mask.

12. The method of claim 1, wherein characterizing the drop comprises performing binary closing to produce the binary mask.

13. The method of claim 1, wherein characterizing the drop comprises performing contour detection to produce the binary mask.

14. The method of claim 1, wherein the size of the drop, the location of the drop, or both are determined based at least partially upon the binary mask.

15. A method for printing an object, the method comprising:
jetting a first drop and a second drop through a nozzle of a printer at a first frequency;
illuminating the first and second drops with a light source as the first and second drops descend from the nozzle, wherein the light source emits first and second pulses of light at a second frequency, wherein the first pulse of light illuminates the first drop, wherein the second pulse of light illuminates the second drop, and wherein the first and second frequencies are substantially synchronized;
capturing a first image of the first drop and a second image of the second drop as the first and second drops descend from the nozzle;
detecting one or more blobs in the first image, wherein a first of the one or more blobs corresponds to the first drop;
characterizing the first drop to produce a binary mask that represents the first drop, wherein a size of the drop, a location of the drop, or both are determined based at least partially upon the binary mask, and wherein the first drop is characterized by:
determining a size difference between the size of the first drop and a mean size of the first and second drops in the first and second images;
determining a location difference between the location of the first drop and a mean location of the first and second drops in the first and second images;
or both; and
adjusting one or more parameters of the printer based at least partially upon the size difference, the location difference, or both.

16. The method of claim 15, further comprising determining that a second of the one or more blobs does not correspond to the first drop because the second blob is in the same location in the first and second images, indicating that the second blob is stationary and not descending.

17. The method of claim 15, further comprising determining that a second of the blobs does not correspond to the first drop because the second blob does not appear in the second image.

18. The method of claim 15, further comprising:
determining a first mean intensity inside of the first blob and a second mean intensity outside of the first blob; and
determining that the first blob corresponds to the first drop based at partially upon a contrast between the first and second mean intensities being greater than a predetermined contrast threshold.

19. The method of claim 18, further comprising:
determining a first region of interest in the first image that includes the first blob;
determining a second region of interest within the first region of interest, wherein the second region of interest also includes the first blob; and
performing Canny edge detection, binary closing, and contour detection within the second region of interest to produce a binary mask over the first blob, wherein the size difference, the location difference, or both are determined based at least partially upon the binary mask.

20. A method for characterizing a plurality of drops that are descending from a nozzle of a printer, the method comprising:
jetting the drops through the nozzle at a first frequency;
illuminating the drops with a light source as the drops descend from the nozzle, wherein the light source emits a plurality of pulses of light at a second frequency, and wherein the first and second frequencies are substantially synchronized such that each pulse of light illuminates one of the drops;
capturing a plurality of images of the drops as the drops descend from the nozzle, wherein the images comprise a plurality of light images and a plurality of dark images, wherein the light images are captured while the pulses of light illuminate the drops such that each of the light images includes at least one of the drops that is visible, and wherein the dark images are captured between the pulses of light;
determining a mean intensity of each of the images;
selecting the light images based at least partially upon the mean intensity, wherein the mean intensity of the light images is greater than a predetermined intensity threshold, and wherein the mean intensity of the dark images is less than the predetermined intensity threshold;
detecting a plurality of blobs in a first of the light images, wherein a first of the blobs corresponds to a first of the drops;
determining that a second of the blobs does not correspond to the first drop because the second blob is in the same location in the light images, indicating that the second blob is stationary and not descending;
determining that a third of the blobs does not correspond to the first drop because the third blob appears only in a subset of the light images;
determining a first region of interest in the first light image that includes the first blob;
determining a first mean intensity inside of the first blob and a second mean intensity outside of the first blob;
determining that the first blob corresponds to the first drop based at partially upon a contrast between the first and second mean intensities being greater than a predetermined contrast threshold;
determining a second region of interest within the first region of interest, wherein the second region of interest includes the first drop;
performing Canny edge detection, binary closing, and contour detection within the second region of interest to produce a binary mask that corresponds to the first drop;
characterizing the first drop by:
determining a size difference between a size of the first drop in the first image and a mean size of the drops based at least partially upon the binary mask; and
determining a location difference between a location of the first drop in the first image and a mean location of the drops based at least partially upon the binary mask; and
adjusting one or more parameters of the printer based at least partially upon the size difference and the location difference.

21. The method of claim 20, wherein the first frequency and the second frequency are between about 100 Hz and about 300 Hz, and wherein a duration of each of the pulses of light is from about 0.001 seconds to about 0.01 seconds.

22. The method of claim 20, wherein capturing the plurality of images of the drops as the drops descend from the nozzle comprises capturing a video of the drops as the drops descend from the nozzle, and wherein the images are frames of the video.

23. The method of claim 20, wherein determining that the second blob does not correspond to the first drop comprises:
   generating a histogram including coordinates of centers of the first blob, the second blob, the third blob, or a combination thereof; and
   determining that the second blob has a histogram count that is greater than a predetermined histogram threshold.

24. The method of claim 20, wherein the third blob is determined to not correspond to the first drop based at least partially upon a mean, a variance, or both of coordinates of centers of the first blob, the second blob, the third blob, or a combination thereof.

\* \* \* \* \*